June 2, 1970  M. SCHUTZ  3,515,040
LIQUID FUEL ROCKET ENGINE
Filed June 5, 1968
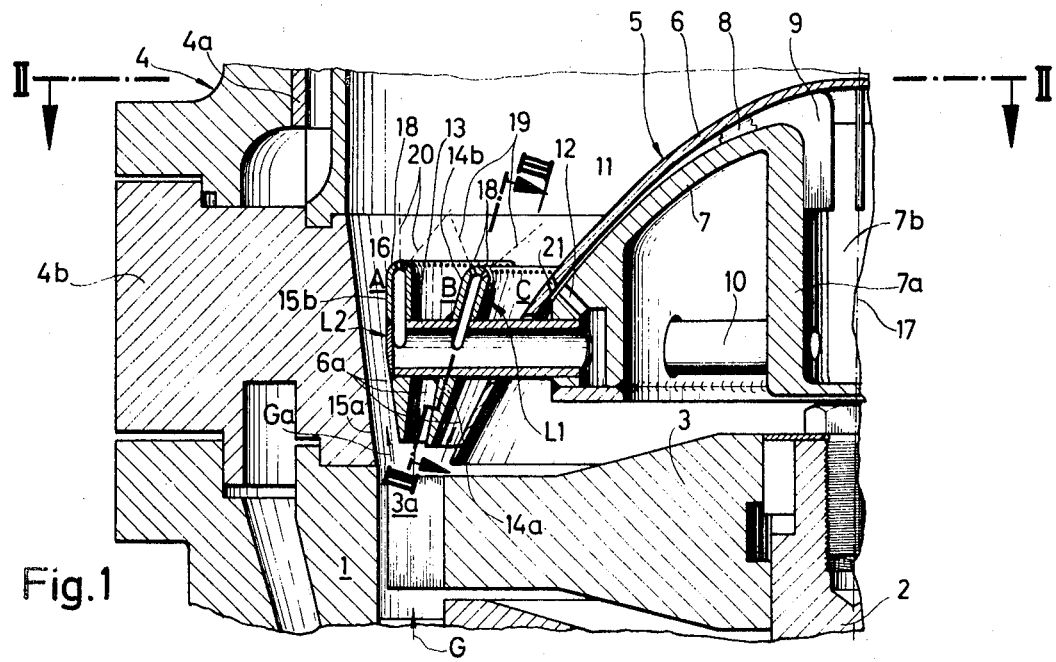
Fig.1
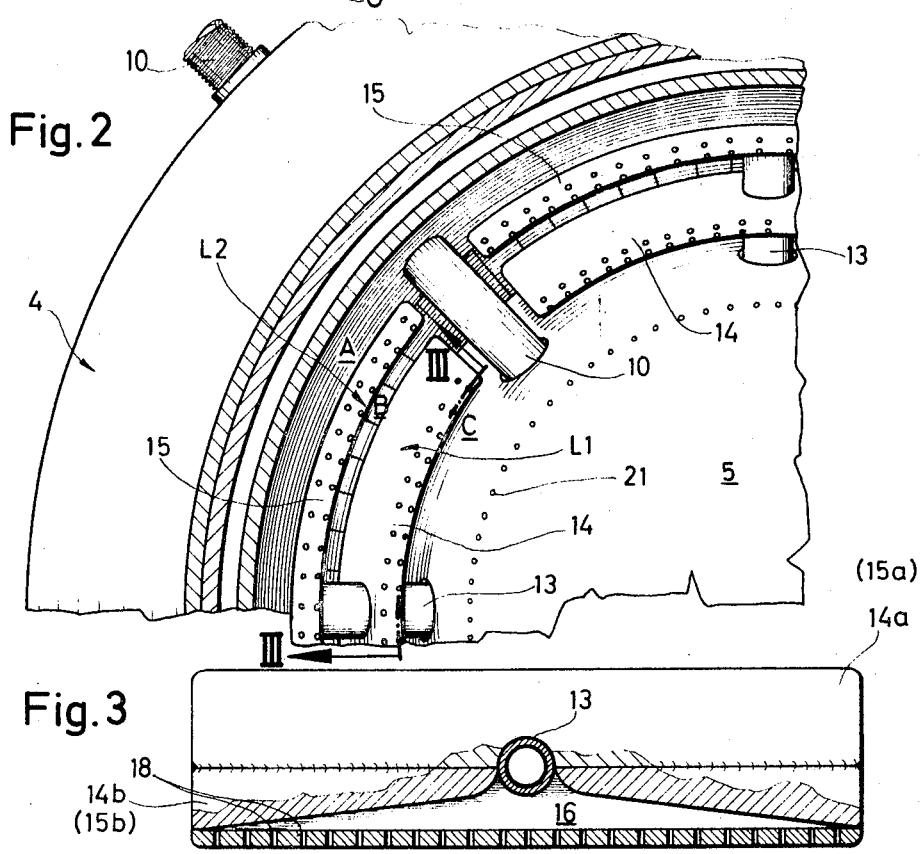
Fig.2
Fig.3
INVENTOR
Manfred Schutz
By McGlew and Toren
ATTORNEYS

United States Patent Office 3,515,040
Patented June 2, 1970

3,515,040
LIQUID FUEL ROCKET ENGINE
Manfred Schutz, Ottobrunn, Germany, assignor to Bolkow Gesellschaft mit beschrankter Haftung, Munich, Germany
Filed June 5, 1968, Ser. No. 734,598
Claims priority, application Germany, June 14, 1967, 1,626,060
Int. Cl. F02k 9/02
U.S. Cl. 60—39.74
16 Claims

ABSTRACT OF THE DISCLOSURE

A liquid fuel rocket engine is formed of a main flow passageway containing a precombustion chamber and a main combustion chamber with an axial flow turbine disposed between them and arranged to be powered by gases from the precombustion chamber. A heat shield is positioned between the turbine and the main combustion chamber with an annular space about the heat shield for the passage of the exhaust gases from the turbine into the main combustion chamber. Guide means are positioned in the annular space for directing the exhaust gases and liquid fuel into the main combustion chamber in a selected flow pattern.

SUMMARY OF THE INVENTION

The present invention is directed to a liquid fuel rocket engine with an axial flow turbine located in its main flow passageway in the path of the gases flowing from the precombustion chamber to the main combustion chamber, and, more particularly, it is concerned with means for directing the flow of liquid fuel along with the gases from the turbine in a predetermined pattern into the main combustion chamber.

In the rocket engine, according to the invention, the precombustion chamber is arranged to supply oxygen rich propellant gases into the main combustion chamber after they pass through an axial flow turbine for operating auxiliary equipment. Located between the portion of the turbine disposed radially inwardly from its blades and the main combustion chamber is a stationary heat shield, which protects the turbine and assists in directing the flow of propellant gases and liquid fuel into the combustion chamber.

In the German Auslegeschrift No. 1,070,882, and the corresponding British Pat. No. 793,689, it is known, in the primary flow circuit of power engines to provide the catalytic preparation of one of the fuel components upstream of an axial turbine used for driving auxiliary units and also to position a stationary, hemispherical shield member behind the turbine blade wheel in the direction of flow. The shield member also directs the flow of the exhaust gases from the turbine through an opening located in advance of the main combustion chamber with as little loss as possible. Moreover, the shield member is arranged to direct backflow, established behind the turbine due to the sudden enlargement in cross section, away from the portion of the turbine wheel inwardly from its bladed section. Further, it is known from the German Auslegeschrift No. 1,088,291, to position a sheet metal cover between the turbine wheel and the main combustion chamber with a space provided between the cover and the turbine wheel through which a portion of the total fuel quantity to be introduced into the combustion chamber is passed for the purpose of distributing and atomizing the fuel and also for cooling the turbine wheel.

In the arrangements disclosed in the German Auslegeschrift No. 1,070,882, the overall length of the engine is increased disadvantageously due to the constriction provided between the turbine exhaust and the main combustion chamber. The constriction is required for regulating the flow and the temperature conditions downstream from the turbine. Similarly, the equipment disclosed in the German Auslegeschrift No. 1,088,291, does not afford adequate means for providing heat protection for the turbine wheel from the high temperatures developed within the main combustion chamber of the rocket engine In this second engine arrangement, the turbine blading is not only cooled by the fuel flowing in that location, but the fuel is directed from that point along the combustion chamber walls where, reacting with the oxygen flow, combustion takes place causing harmful high temperatures along the combustion chamber wall which are considered most disadvantageous.

Accordingly, it is the primary object of the present invention to provide a rocket engine arrangement which regulates the flow of the propellant components into the main combustion chamber in an advantageous manner and also prevents harmful thermal stresses from effecting the axial flow turbine in the flow passageway through the rocket engine.

Another object of the invention is to provide a combination of guide means and a heat shield for directing the flow of the propellant components into the main combustion chamber.

Still, another object of the invention is to furnish an arrangement for suspending the heat shield within the main flow passageway through the rocket engine at the same time transporting the liquid fuel into the rocket engine for its eventual passage into the main combustion chamber.

A further object of the invention is to supply a flow arrangement for passing the liquid fuel into the guide means from where it is directed, in a selected pattern, into the main combustion chamber.

Yet, another object of the invention is to provide a heat shield construction which protects the turbine wheel from the high temperatures within the main combustion chamber and affords means for directing at least a portion of the liquid fuel and propellant gases into the main combustion chamber.

Moreover, another object of the invention is to dispose the guide means in an annular space about the heat shield within the flow passageway of the rocket engine for flowing the fuel components into the main combustion chamber in a pattern which provides the optimum combustion conditions. Further, the guide means are arranged to direct exhaust gases from the turbine over the walls of the main combustion chamber so that the gases are either free of liquid fuel or have a reduced amount of fuel compared to the mixture contained radially inwardly within the main combustion chamber.

A still further object of the invention is to form the guide means as ring sections containing hollow spaces in the portions facing the main combustion chamber with openings therefrom for directing the liquid fuel from the hollow spaces into the combustion chamber in a selected pattern.

Therefore, the present invention comprises an axial flow turbine disposed between the precombustion chamber and main combustion chamber of a rocket engine with a heat shield disposed between the portion of the turbine disposed inwardly from its blades and the main combustion chamber. The heat shield is disposed radially inwardly from the walls forming the flow passageway and provides an annular space about its outer edge and concentric guide ring sections are positioned within this annular space for deflecting the exhaust gas from the turbines into the main combustion chamber principally in a radially inward direction. Moreover, the guide ring sections also serve to introduce the liquid fuel into the main combustion chamber in a manner whereby the ratio of the liquid fuel to the oxygen enriched gases from the precombustion chamber decreases in a radial direction from the center to the outer region of the combustion chamber.

To achieve the desired pattern of flow into the main combustion chamber, the outer guide ring section has its surfaces oriented in parallel relationship with the longitudinal center line of the main combustion chamber while the surfaces of the inner guide ring sections are inclined inwardly toward the longitudinal axis of the combustion chamber in the direction of flow. In this manner, the opposed surfaces of the inner and outer guide ring sections are in diverging relationship in the direction of the flow into the combustion chamber so that annular diffuser sections are formed therebetween. Moreover, the guide ring sections also contain hollow spaces which are provided with openings oriented in such a manner as to selectively direct the flow of liquid fuel into the main combustion chamber. In the inner ring sections, the openings are arranged to provide flow in a fan shaped pattern limited by lines extending from the openings in the guide ring sections disposed obliquely outwardly from and inwardly toward the axis of the combustion chamber. However, the openings in the outer guide ring sections are located to limit the pattern of flow into the main combustion chamber between an outer line extending parallel with the axis of the combustion chamber and an inner line inclined inwardly toward the axis of the combustion chamber.

Due to the manner in which the oxygen enriched gases and the liquid fuel are introduced into the main combustion chamber, the chamber is automatically filled and the development of a central low pressure zone is suppressed. With the flow pattern imparted by the combination of the guide ring sections and the heat shield structure, the entire supply of liquid fuel is introduced in a finely atomized condition and in a specific distribution pattern whereby its ratio in proportion to the oxygen decreases radially outwardly from the center of the chamber. With this decreasing ratio, it is possible to provide the area adjacent the walls of the combustion chamber either devoid of fuel or with a very low fuel content so that relatively low temperatures are generated in that portion of the combustion chamber and excessive thermal stresses are avoided in the adjacent passageway walls. Moreover, a pressure increase is achieved due to the arrangement of the passageway walls, the guide ring section, and the heat shield into annular diffusers while the axial dimension of the flow passageway remains the same. Additional advantages due to this construction are the reduction in the length of the combustion chamber which is achieved by the reduction in the burn-out length and, further, maximum utilization of the combustion chamber volume is achieved.

Another characteristic of the invention is the disposition of the heat shield structure which conducts the total flow of liquid fuel prior to its injection into the combustion chamber so that the heat shietld is cooled and, at the same time, the fuel is preheated, thereby increasing the overall efficiency of the operation. Moreover, the tubes which supply the fuel to the guide ring sections are secured to the heat shield structure and serve to support the guide ring sections.

In accordance with the invention, the heat shield is formed of two main parts, a parabolically shaped hood having its convex surface facing toward the main combustion chamber and a housing located within the turbine side of the hood. The configuration of the hood assists in directing flow into the main combustion chamber. The housing affords an enclosed chamber through which the entire supply of liquid fuel passes prior to its entry through the hood and the guide ring sections into the main combustion chamber. The tubes which supply fuel into the chamber are attached to the housing and are disposed in spaced relationship from the hood.

In addition, the housing within the heat shield hood provides a fuel inlet chamber from which a plurality of angularly spaced tubes extend to the guide ring sections. The tubes are in communication with the hollow spaces in the guide rings and support the guide ring sections.

The guide ring sections extend in a circular path through the annular space about the outer edge of the heat shield. The annular space is divided into several sectors each containing an outer ring section interconnected to an inner ring section by fuel inlet tubes. Each of the ring sections has a solid portion extending toward the turbine side of the heat shield and a hollow section extending in the opposite direction toward the main combustion chamber. The tube which supplies fuel from the the chamber within the heat shield housing is connected to the center of the hollow space and the hollow space narrows down in the circumferential direction from the center to its ends.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial longitudinal section through the flow passageway in a liquid fuel rocket engine which embodies the present invention;

FIG. 2 is a view, partly in section, taken along the line II—II of FIG. 1; and

FIG. 3 is a view, partly in section, taken along line III—III as shown in FIGS. 1 and 2.

DETAILED DESCRIPTION OF THE PREFERRED EMBODIMENT

In FIG. 1, there is shown a portion of the main flow passageway through a liquid fuel rocket engine which includes a precombustion chamber section 1 followed in the direction of flow by an axial flow turbine 3 mounted on a shaft 2 along the axis of the passageway. The turbine 3 is employed to drive auxiliary units such as fuel pumps, regulators, electrical generators and pressure medium generators and its blades 3a are disposed in the path of flow of the fuel gases G generated within the precombustion chamber 1. The main combustion chamber 4 of the flow passageway is defined by a combustion chamber housing 4a and a frustoconically shaped combustion chamber head 4b extending between the smaller diameter precombustion chamber section and the larger diameter combustion chamber housing 4a.

The section of the turbine 3 disposed radially inward from its blades 3a is shielded against the temperature conditions within the main combustion chamber by a heat shield 5 which is comprised of a parabolically-shaped hood 6 and a housing 7. The convex surface of the hood 6 is directed toward the main combustion chamber 4 and the housing is disposed within the hood on its turbine side. The housing is spaced from the hood 6 and provides a space 8 therebetween containing a plurality of radially extending sheet metal guides 9. Walls 7a of the housing 7 are disposed about the axis 17 of the flow passageway and form a closed chamber 7b in communication with the flow space 8. As indicated in FIGS. 1 and 2, main fuel inlet tubes extend through the walls forming the main combustion chamber and are connected into the housing for supplying fuel into the chamber 7b located within the housing. While the tubes 10 are secured to the housing a clearance is provided for their passage through the hood 6 and, accordingly, they form a support for the heat shield structure without contacting the hood. Further, this arrangement is insensitive to heat distortions. Moreover, the walls forming the housing 7 are arranged to provide an annular-shaped chamber 11 located about the radially outer section of the housing. A plurality of passages 12 extend through the walls of the housing 7 and communicate between the space 8 and the annular chamber 11.

The hood 6 of the heat shield is spaced inwardly from the walls of the combustion chamber head 4b forming an annular passageway 6a extending between the bladed portion of the turbine wheel 3 and the main combustion chamber 4. Intermediate fuel supply tubes 13 are connected at their radially inner ends to the annular chamber 11 within the housing 7 and extend outwardly into the annular passageway 6a. As indicated in the drawing, the intermediate tubes 13 support two guide ring sections, however, it will be appreciated that the number of concentrically disposed guide ring sections may be varied in accordance with the flow pattern required for directing liquid fuel and gases from the precombustion chamber into the main combustion chamber.

In the arrangement shown in FIGS. 1 and 2, the intermediate tubes 13 support an inner guide ring L1 and an outer guide ring L2. In effect, the guide rings L1 and L2, arranged to direct the flow into the main combustion chamber, are divided into guide ring sections 14 and 15 which extend in a circular path about the outer edge of the heat shield hood 6 and are discontinuous at the location of the main fuel tubes 10. Each tube 13 supports one inner guide ring section 14 and one outer guide ring section 15 at their midpoints. Each of the guide ring sections, as viewed in FIG. 1, has a solid part 14a, 15a with the walls in diverging relationship in the direction of flow through the annular passageway 6a and a hollow part 14b, 15b extending from the solid parts toward the main combustion chamber. Each of the hollow parts 14b, 15b contains a hollow space 16 in communication with the attached intermediate fuel tube 13. As shown in detail in FIG. 3, the hollow space 16 extending longitudinally through the annular space in the circumferential direction and narrows from the location of the tube 13 to the opposite ends of the hollow space 16.

The inner and outer side surfaces of the outer ring section 15 located adjacent the main combustion chamber extend in parallel relationship with the axis 17 of the flow passageway. However, the similarly positioned inner and outer side surfaces of the inner ring section 14 are inclined toward the axis 17 in the direction of flow into the main combustion chamber. Accordingly, annularly extending diffuser sections A, B and C are formed through the annular passageway, with the diffuser section A formed between the inner surface of the combustion chamber head 4b and the opposed surface of the outer ring section 15, the diffuser section B is formed between the inner surface of the outer ring section 15 and the outer surface of the inner ring section 14, and the diffuser section C is located between the inner surface of the inner surface of the inner ring section 14 and the opposed surface of the heat shield hood 6.

At the downstream ends of the inner ring sections 14 and the outer ring sections 15, fuel injection openings 18, respectively, are provided for supplying the fuel into the main combustion chamber. In FIG. 1, dotted lines 19 are shown extending from the openings 18 in the inner ring sections 14, which indicate the flow pattern of the fuel injected through the openings into the combustion chamber. The openings 18 provide a fan-like distribution, the radially outer limit of the pattern being disposed obliquely away from the axis 17 and the radially inner limit being inclined toward the axis 17. On the other hand, the openings 18 in the outer ring section 15 provide a fan-like distribution 20 in which the outer limit of the distribution extends in a plane parallel with the axis 17 while the inner limit is disposed in a plane inclined inwardly toward the axis 17. In addition to the fuel openings 18 in the inner and outer ring section 14 and 15, additional fuel openings 21 are provided through the heat shield hood 5 in communication with the space 8. The openings 21 are located in approximately the same transverse plane as the openings 18 through the guide ring sections.

In the arrangement of the inner and outer guide ring sections 14, 15, at least the portion of the turbine exhaust gas flow Ga which flows inwardly of the outer guide ring sections 15 is directed toward the axis of the main combustion chamber and fills the central low pressure zone of the combustion chamber. Since the fuel injection through the openings 18 and 21 is mainly directed toward the axis 17 of the main combustion chamber, the concentration of fuel is greater in the center of the combustion chamber and becomes progressively less in the radially outward direction toward the walls 4a of the chamber. Accordingly, the zone along the walls 4a of the combustion chamber contains no fuel or only a relatively low fuel content.

Because of the flow of the liquid fuel, from the heat shield housing, through the intermediate tubes 13 into the hollow spaces 16 within the inner and outer ring sections, these ring sections are continuously and evenly cooled and, in turn, the fuel is heated prior to its injection into the main combustion chamber. Further, because of the configuration of the hollow spaces 16 within the ring sections, no "dead flow pockets" are formed and the surface cooling and fuel heating operation continues in an efficient and effective manner.

While a specific embodiment of the invention has been shown and described in detail to illustrate the application of the inventive principles, it will be understood that the invention may be embodied otherwise without departing from such principles.

What is claimed is:

1. A liquid fuel rocket engine comprising wall means forming an axially extending main flow passageway, a precombustion chamber disposed in the passageway and arranged to generate gases, a main combustion chamber arranged in the passageway downstream in the direction of flow from said precombustion chamber, an axial flow turbine disposed in the passageway between said precombustion chamber and said main combustion chamber and arranged to receive gases from said precombustion chamber and for exhausting the gases into the main combustion chamber, said turbine having an annular blade section located in the radially outer portion of the flow passageway, a heat shield disposed between said turbine and said main combustion chamber and the outer edge of said heat shield disposed radially inwardly from the walls forming said flow passageway and providing an annular passageway therebetween, said heat shield providing a protective barrier between said main combustion chamber and the portion of said turbine disposed radially inwardly from the bladed section thereof, guide means disposed in the annular space between said heat shield and said wall means and arranged to cooperate with said heat shield and said wall means for directing the exhaust gases from the bladed section of said turbine into said main combustion chamber, said guide means comprises a plurality of circumferentially extending inner ring sections and a plurality of circumferentially extending outer ring sections spaced radially outwardly from said inner ring sections, and said inner and outer ring sections arranged to provide, in combination with said heat shield and wall means forming the flow passageway, a plurality of flow paths having the opposed wall surfaces thereof arranged in diverging relationship in the direction of flow into said main combustion chamber.

2. A liquid fuel rocket engine, as set forth in claim 1, wherein said heat shield comprises a curved hood and a housing, said curved hood symmetrically disposed about the axis of said passageway and having the convex surface thereof facing toward said main combustion chamber, said housing disposed within said hood on said turbine side thereof, said hood and housing spaced apart to form a flow space therebetween extending radially outwardly from the axis of said passageway, and partition means are formed within said housing forming a chamber in communication with the space between said housing and said hood.

3. A liquid fuel rocket engine as set forth in claim 1, wherein said inner and outer ring sections are positioned relative to the axis of said flow passageway for directing the turbine exhaust gases in a flow pattern wherein in the radially outer portion of said main combustion chamber the exhaust gases flow in a direction parallel with the axis of said passageway and disposed inwardly therefrom the gases are directed to flow in a direction inclined inwardly toward the axis of said combustion chamber.

4. A liquid fuel rocket engine as set forth in claim 3, wherein the edges of said inner and outer guide ring sections facing in the upstream direction in the path of flow of said exhaust gases into said main combustion chamber have a generally pointed configuration and the opposed surfaces thereof extend longitudinally therefrom in diverging relationship.

5. A liquid fuel rocket engine, as set forth in claim 1, wherein said heat shield is symmetrically disposed about the axis of said passageway and the surface thereof facing said main combustion chamber is convex, and the surfaces of said inner ring sections located adjacent the surface of said heat shield are inclined inwardly toward the axis of said passageway in the direction of flow into said main combustion chamber for directing the flow of turbine exhaust gases therebetween toward the axial center of said main combustion chamber.

6. A liquid fuel rocket engine as set forth in claim 1, wherein the inner surface of said outer ring sections extends substantially parallel to the axis of the flow passageway for directing turbine exhaust gases flowing therealong in the axial direction of said main combustion chamber.

7. A liquid fuel rocket engine as set forth in claim 1, wherein the surface of said wall means disposed opposite to the outer surface of said outer ring sections is in diverging relationship with the axis of said main combustion chamber in the direction of flow therethrough for directing the flow of turbine exhaust gases passing between the surface of said wall means and the opposed surface of said outer ring section along the surface of said wall means within said main combustion chamber.

8. A liquid fuel rocket engine as set forth in claim 2, wherein a main fuel inlet tube extends through said wall means into said flow passageway and is secured at its inner end into said housing for supplying fuel into the chamber therein, said main fuel inlet tube disposed in spaced relationship to said hood and said ring sections for supporting said housing and freely supporting said hood therefrom.

9. A liquid fuel rocket engine as set forth in claim 8, wherein said housing is arranged to provide an annular chamber extending therethrough in communication with the flow space between said hood and housing.

10. A liquid fuel rocket engine as set forth in claim 9, wherein said inner and outer ring sections extend longitudinally in the axial direction of said passageway and each of said inner and outer ring sections contains a hollow space in the portion thereof adjacent said main combustion chamber.

11. A liquid fuel rocket engine as set forth in claim 10, wherein a plurality of angularly spaced intermediate fuel supply tubes extend from said annular chamber in said housing radially outwardly into communication with the hollow spaces in said inner and outer ring sections, each of said intermediate tubes secured to and supporting one of said inner and one of said outer ring sections within the annular space between said heat shield and the said wall means forming said flow passageway.

12. A liquid fuel rocket engine as set forth in claim 11, wherein the end surfaces of said inner and outer guide ring sections located adjacent said main combustion chamber have openings formed therethrough communicating with the hollow spaces disposed therein for injecting fuel into said main combustion chamber.

13. A liquid fuel rocket engine as set forth in claim 12, wherein each said inner guide ring section has a pair of circumferentially extending radially-spaced rows of said openings, said rows of openings arranged to provide a fan-like distribution for the fuel injected from the openings into said main combustion chamber, the plane defining the radially outer limit of said fan distribution directed angularly outwardly from the axis of said main combustion chamber, and the plane defining the radially inner limit of said fan distribution inclined inwardly toward the axis of said main combustion chamber.

14. A liquid fuel rocket engine as set forth in claim 12, wherein each said outer guide ring section contains a pair of circumferenetially extending radially-shaped rows of the openings, said pairs of rows of openings arranged to provide a fan-like distribution for the flow of fuel into said main combustion chamber, the plane defining the radially outer limit of said fan distribution extending in a direction parallel with the axis of said main combustion chamber, and the plane defining the radially inner limit of said fan distribution being inclined inwardly toward the axis of said main combustion chamber.

15. A liquid fuel rocket engine as set forth in claim 12, wherein said hood contains openings therethrough communicating with the space between said hood and said housing for supplying liquid fuel into said combustion chamber, the openings in said hood disposed in a transverse plane located closely adjacent to the transverse planes of the openings in said inner and outer guide ring sections.

16. A liquid fuel rocket engine, as set forth in claim 1, wherein the opposed surfaces between said wall means forming said passageway and the outer surface of said outer ring section, between the inner surface of said outer ring section and the outer surface of said inner ring section, and between the inner surface of said inner ring section and the opposed surface of said hood are disposed in diverging relationship in the direction of flow of turbine exhaust gases into said main combustion chamber for forming diffuser sections between said turbine and said main combustion chamber.

References Cited

UNITED STATES PATENTS

| 2,479,776 | 8/1949 | Price | 60—261 |
| 3,413,810 | 12/1968 | Kaufmann | 60—261 |

FOREIGN PATENTS

| 793,689 | 4/1958 | Great Britain. |
| 906,865 | 9/1962 | Great Britain. |

MARK M. NEWMAN, Primary Examiner

D. HART, Assistant Examiner

U.S. Cl. X.R.

60—261